Nov. 25, 1958
L. E. MULLER
2,861,479
DRIVING AXLE ASSEMBLY
Filed Nov. 16, 1955
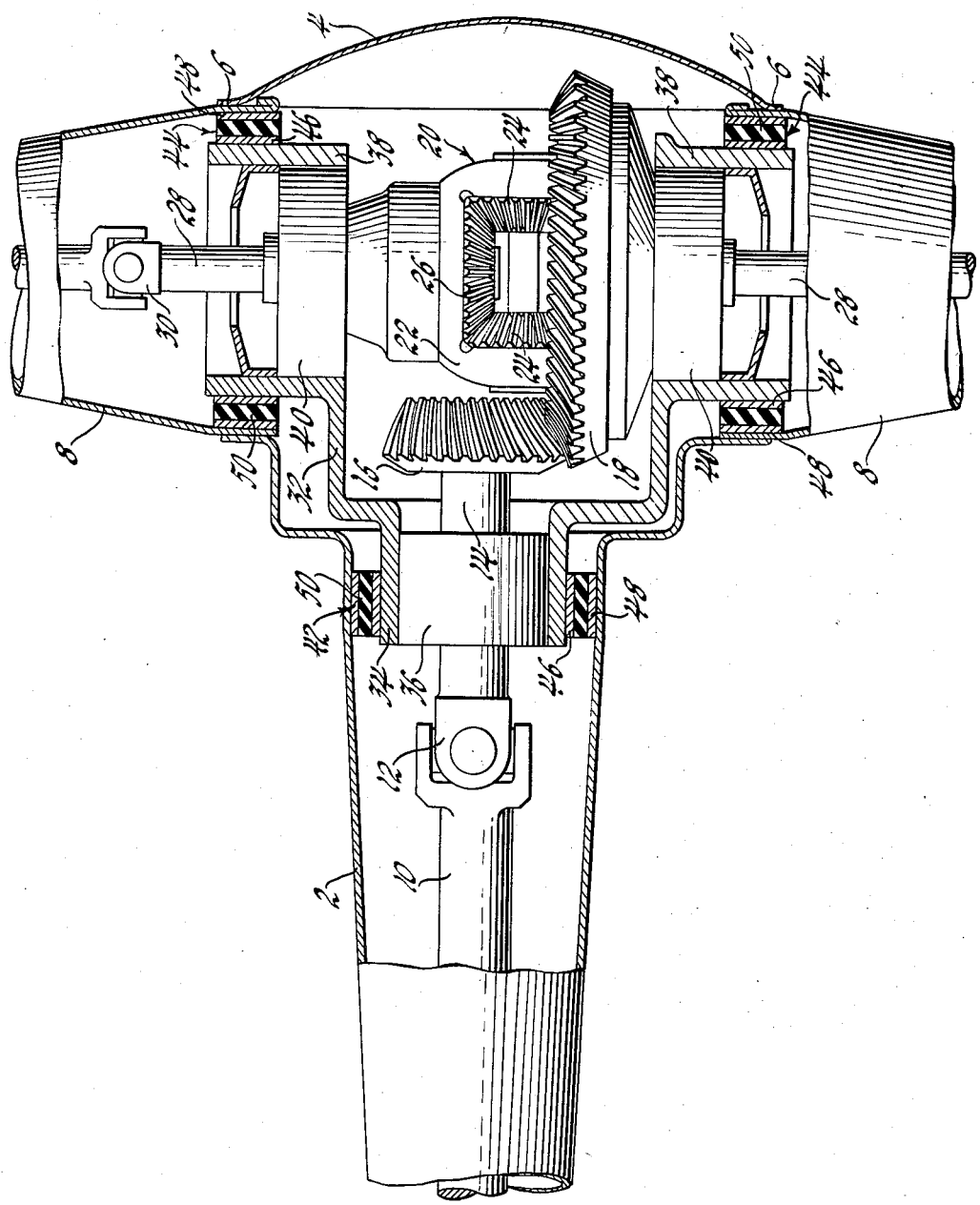
INVENTOR.
Lloyd E. Muller
BY
S. C. Thorpe
ATTORNEY

United States Patent Office

2,861,479
Patented Nov. 25, 1958

2,861,479

DRIVING AXLE ASSEMBLY

Lloyd E. Muller, Flint, Mich., assignor to General Motors Corporation, Detroit, Mich., a corporation of Delaware Application November 16, 1955, Serial No. 547,141

3 Claims. (Cl. 74—713)

This invention relates generally to improvements in axle driving assemblies for automotive vehicles and more particularly to rear axle differential assemblies of such vehicles having a propeller shaft drivingly connected thereto.

The invention particularly concerns the problem of isolating as much as possible the fluctuating forces created by the sets of running gears of the differential from being transmitted to surrounding structural members, such as the propeller shaft housing or torque tube and the supports to which it is attached and also to the differential and axle housing and members to which these latter two housings may be attached.

It is well known that running gears of a differential create fluctuating forces which tend to cause vibrational excitations of supporting and surrounding structural members. Not only do these vibrational excitations have a deleterious effect on surrounding structure but they also cause an unpleasant sensation for the occupants of the vehicle. In addition, a substantial amount of noise attends these vibrational disturbances which also is extremely undesirable and obnoxious to the occupants of the vehicle.

It is therefore broadly an object of the present invention to substantially prevent vibrational excitation of the surrounding and supporting structural members of a driving axle differential created by the sets of running gears thereof.

It is a more specific object of this invention to minimize the transferral of vibrations and noise of the differential through the provision of a novel supporting means for the differential carrier and one end of the propeller shaft and which is supported by the torque tube and, differential and axle housings through the medium of vibration damping and isolation means.

It is an even more specific object of this invention to provide a driving axle assembly, including a propeller shaft housing and differential and axle housings, a unique frame for rotatably supporting the differential carrier and propeller shaft and which is supported in the housings through the medium of resilient sound and vibration damping and isolation bushings and which assembly further includes the provision of flexible joints in the axles and the propeller shaft so as to prevent any increase in the noise between the gears of the differential which might otherwise be caused by movement of the carrier supporting frame relative to the housings occasioned by the presence of the damping and isolation means.

For a fuller understanding of this invention and the objects thereof reference may be had to the accompanying detailed description and the drawing, in which the single figure represents a plan view in section with parts broken away illustrating an axle driving assembly including the propeller shaft and differential and axle housings, the differential being supported by the unique frame resiliently bushed in the housings.

Referring to the drawing, the numeral 2 indicates a propeller shaft housing or, in this instance, a torque tube which is adapted to take the reaction forces resulting from the wheels being turned by the driving assembly. The torque tube has fixed thereto and supports a differential housing 4 which acts as a support for the ends 6 of axle housings 8. These housings, i. e., 2, 4 and 8, may be secured together in a suitable manner such as by a press fit, welding, or the use of studs.

Housed in the torque tube 2 is a propeller shaft 10 which includes a universal connection 12 and has fixed to an end 14 a driving pinion 16. The driving pinion 16 is in meshing engagement with a ring gear 18 which is a part of the differential assembly indicated by a numeral 20. The differential 20 in addition to ring gear 18 includes the usual gear case or carrier 22, side pinions 24, and side gears 26. Secured to the side gears 26 are the driving axles 28 which also include flexible connections or universal joints 30.

It will be observed that instead of being journaled for rotation in bearing means rigidly connected to the torque tube 2, the propeller shaft 10 and carrier 22 are journaled for rotation in a novel and separate frame 32. The frame 32 includes a boss 34 which receives a suitable bearing or bearing set 36 journaling shaft 10 for rotation. In addition to boss 34, frame 32 also includes oppositely disposed bosses 38 which may be provided with suitable bearings or bearing sets 40 journaling the carrier 22, ring gear 18, and axle sets 28 for rotation.

The frame 32, it will be observed, is supported by the bosses 34 in the torque tube 2, the differential housing 4 and axle housings 6 by means of bushed devices 42 and 44. These devices 42 and 44 comprise inner and outer bushings or rings 46, 48 having a ring of resilient or vibration damping and isolating material 50 therebetween. The material 50 is preferably bonded to the rings 46, 48 and may be of any suitable material having good vibration and noise damping and isolation characteristics, and in the present embodiment is shown as being rubber. The rings 46 and 48 may be made of a size to cause a very tight press fit between the ends 6 of the axle housings 8, the torque tube 2 and the bosses 34 and 38.

By supporting the differential and the end 14 of the propeller shaft 10 in the unique frame 32 it will be readily perceived that very little if any vibration due to the fluctuating forces created by the running gears of the differential will be transmitted to the torque tube 2 and the differential and axle housings 4 and 8. This is particularly true because of the fact that the frame 32 is a unitary member which journals both the differential and the propeller shaft so that no misalignment can occur between the teeth of the ring gear and the driving pinion 16. The presence of the flexible joints 12 and 30 tends to prevent or relieve any binding that might be encountered between these parts due to movement of the frame in the rubber bushings.

From the foregoing it may now be appreciated that the provision of the novel differential frame 32 represents a substantial improvement over prior differential driving assemblies because it reduces or eliminates the transmittal of vibrations and noise caused by the sets of running gears of the differential.

What I claim is:

1. A rear axle driving assembly comprising a propeller shaft having a driving pinion on one end thereof, a longitudinally extending torque tube enclosing said propeller shaft and including means for journaling said shaft for rotation therein, an axle and differential housing fixed at right angles to said torque tube, a differential including axle driving means and a ring gear in meshing engagement with said pinion, a differential carrier, a supporting frame for said carrier having transversely extending portions journaling said ring gear and axle driving means for rotation, and resilient means between the transverse portions of said frame and said housing resiliently supporting said frame in said housing so as to inhibit the transfer for vibrations created by the sets of running gears of the differential to said housing.

2. In a rear axle driving assembly, a propeller shaft having a driving pinion fixed to one end thereof, a torque tube enclosing said shaft, a differential housing fixed to said torque tube, a differential carrier in said housing, a supporting frame for the carrier including a boss extending longitudinally into said torque tube and oppositely disposed bosses extending transversely in said housing, said longitudinally extending boss including means journaling said shaft for rotation therein, bushings interposed between said longitudinally extending boss and said torque tube supporting said longitudinally extending boss in said tube, a differential including a ring gear in meshing engagement with said pinion, axle driving means journaled for rotation in said oppositely disposed bosses, and bushings interposed between the walls of said housing and said oppositely disposed bosses supporting said frame in said housing, said bushings being of vibration damping material.

3. In an axle driving assembly, a torque tube member and differential and axle housing members fixed together at right angles to form a casing for a propeller shaft and differential and axle assembly, a supporting frame enclosed by said members, a longitudinally extending propeller shaft journaled for rotation in said frame and including a transversely extending driving pinion on one end thereof, a differential and axle assembly journaled for rotation in said frame and including a ring gear in meshing engagement with said driving pinion, and resilient means between said frame and said members supporting said carrier therein.

References Cited in the file of this patent

UNITED STATES PATENTS

| | | |
|---|---|---|
| 899,891 | Niclausse | Sept. 29, 1908 |
| 1,002,858 | McCue | Sept. 12, 1911 |
| 1,076,560 | Duffy | Oct. 21, 1913 |
| 2,297,400 | Friedrich | Sept. 29, 1942 |

UNITED STATES PATENT OFFICE

CERTIFICATE OF CORRECTION

Patent No. 2,861,479                                          November 25, 1958

Lloyd E. Muller

It is hereby certified that error appears in the printed specification of the above numbered patent requiring correction and that the said Letters Patent should read as corrected below.

Column 4, line 9, strike out "transversely extending" and insert the same before "differential" in line 10, same column.

Signed and sealed this 5th day of May 1959.

(SEAL)
Attest:

KARL H. AXLINE                                                  ROBERT C. WATSON

Attesting Officer                                             Commissioner of Patents